United States Patent [19]

Walker

[11] Patent Number: 4,614,599
[45] Date of Patent: Sep. 30, 1986

[54] ENCAPSULATED LIME AS A LOST CIRCULATION ADDITIVE FOR AQUEOUS DRILLING FLUIDS

[75] Inventor: Clarence O. Walker, Richmond, Tex.

[73] Assignee: Texaco Inc., White Plains, N.Y.

[21] Appl. No.: 718,627

[22] Filed: Apr. 1, 1985

[51] Int. Cl.$^4$ ............................................... C09K 7/02
[52] U.S. Cl. ..................................... 252/8.512; 175/72
[58] Field of Search ...................... 252/8.5 LC, 8.5 A; 175/72; 428/402.24, 403, 407; 206/524.5; 166/293

[56] References Cited

U.S. PATENT DOCUMENTS

| | | | |
|---|---|---|---|
| 2,705,050 | 3/1955 | Davis et al. | 175/72 X |
| 2,856,354 | 10/1958 | Armentrout | 252/8.5 |
| 3,161,602 | 12/1964 | Herbig et al. | 428/402.24 X |
| 3,362,476 | 1/1968 | van Poollen | 175/72 X |
| 3,557,876 | 1/1971 | Tragesser | 175/72 X |
| 3,971,852 | 7/1976 | Brenner et al. | 426/103 |
| 4,036,301 | 7/1977 | Powers et al. | 166/293 |
| 4,078,612 | 3/1978 | Gallus | 166/299 |
| 4,252,193 | 2/1981 | Powers et al. | 166/292 |
| 4,269,279 | 5/1981 | House | 175/66 |
| 4,362,566 | 12/1982 | Hinterwaldner | 106/8.5 |
| 4,481,121 | 11/1984 | Barthel | 252/8.5 |
| 4,498,995 | 2/1985 | Gockel | 252/8.5 |

Primary Examiner—Herbert B. Guynn
Attorney, Agent, or Firm—Jack H. Park; Kenneth R. Priem; Harold J. Delhommer

[57] ABSTRACT

The disclosed invention is a novel drilling fluid additive for use in reducing lost circulation in wellbores and a method for employing the invention additive for reducing such lost circulation. The invention additive is lime encapsulated by a reaction-preventive protective casing to prevent the lime from reacting with clays in the borehole until it is desired to breach the casing. The reaction-preventive protective casing may be a film which will dissolve after a desired time of residence in the borehole or a film or waxy substance which will dissolve or melt at a desired temperature in the borehole, releasing the lime to react with clays in the formation or in the borehole to form a cement-like mass.

6 Claims, No Drawings

ENCAPSULATED LIME AS A LOST CIRCULATION ADDITIVE FOR AQUEOUS DRILLING FLUIDS

BACKGROUND OF THE INVENTION

This invention relates to a novel additive for reducing lost circulation when aqueous drilling fluids are used and a method for reducing such lost circulation. More particularly, the lost circulation additive is an encapsulated lime which will be unable to react with clays in the borehole until reaction is desired to form a cement-like product.

Drilling fluids, or drilling muds as they are sometimes called, are slurries of clay solids used in the drilling of wells in the earth for the purpose of recovering hydrocarbons and other fluid materials. Drilling fluids have a number of functions, the most important of which are: lubricating the drilling tool and drill pipe which carries the tool, removing formation cuttings from the well, counterbalancing formation pressures to prevent the inflow of gas, oil or water from permeable rocks which may be encountered at various levels as drilling continues, and holding the cuttings in suspension in the event of a shutdown in the drilling and pumping of the drilling fluid.

For a drilling fluid to perform these functions and allow drilling to continue, the drilling fluid must stay in the borehole. Frequently, undesirable formation conditions are encountered in which substantial amounts or, in some cases, practically all of the drilling fluid may be lost to the formation. Drilling fluid can leave the borehole through large or small fissures or fractures in the formation or through pores in the rock matrix surrounding the borehole.

Most wells are drilled with the intent of forming a filter cake of varying thickness on the sides of the borehole. The primary purpose of the filter cake is to reduce the large losses of drilling fluid to the surrounding formation. Unfortunately, formation conditions are frequently encountered which may result in unacceptable losses of drilling fluid to the surrounding formation despite the type of drilling fluid employed and filter cake created.

A variety of different substances are now pumped down well bores in attempts to reduce the large losses of drilling fluid to fractures and the like in the surrounding formation. Different forms of cellulose are the preferred materials employed. Some substances which have been pumped into well bores to control lost circulation are: almond hulls, walnut hulls, bagasse, dried tumbleweed, paper, coarse and fine mica, and even pieces of rubber tires. These and other prior art additives are described in U.S. Pat. No. 4,498,995.

Another process that is employed to close off large lost circulation problems is referred to in the art as gunk squeeze. In the gunk squeeze process, a large quantity of a gel is mixed in diesel oil and pumped down the well bore. Water injection follows the gel and diesel oil. If mixed well, the water and gel will harden to form a gunky semi-solid mess, which will reduce lost circulation. Problems frequently occur in trying to adequately mix the gel and water in the well.

U.S. Pat. No. 4,481,121 reacts a mixture of lime and wax to produce a soap in an oil based mud. The patent describes a process wherein a montan wax is dispersed within a drilling fluid to provide viscosity and gel strength. Lime is added to the oil based fluid to react with the small amounts of water in the oil based fluid and the montan wax. Partial saponification produces a more thixotropic fluid.

The last few years have witnessed a drastic increase in research on encapsulated products and methods to produce such products. This is particularly so in the pharmaceutical field. And it is now becoming recognized that encapsulation technology may be useful in many other fields.

U.S. Pat. No. 3,971,852 describes a process for encapsulating various fragrance oils such as oils with citrus and spice odors. The oils are encapsulated in a matrix comprised of polysaccharide and polyhydroxy compounds by converting an emulsion of the fragrance oil droplets in a solution of the matrix ingredients to an encapsulated solid state during a spray drying process. The patent also mentions that miscellaneous chemicals can be encapsulated by the invention method such as drilling fluids and waxes.

U.S. Pat. No. 4,269,279 discloses the use of plastic coated magnetic particles in a bead form to increase lubrication for drilling fluids. The encapsulated ferromagnetic particles can be recovered for reuse with a magnetic separator.

An encapsulated invention which has been disclosed for use in boreholes is described in U.S. Pat. No. 4,078,612. The patent describes an explodable material encapsulated in natural gums slurried in a liquid vehicle. The material is pumped into the formation around the wellbore and exploded to increase permeability.

Another U.S. Pat. No. 4,036,301 describes an encapsulated material useful in cementing a well, wherein a cement accelerator is encapsulated in a waxy material and placed within a highly retarded cement slurry. The cement slurry is pumped into the well with the encapsulated accelerator. After proper placement of the cement, circulation is decreased so that the temperature of the cement fluid approaches the bottom hole temperature of the well and melts the encapsulated material, freeing the accelerator which sets the cement.

U.S. Pat. No. 4,362,566 discloses an additional use of encapsulated materials. The patent suggests encapsulating one component of a two or more component adhesive or cement mixture so that the adhesive or cement will not set until the encapsulated component is freed from its reaction-preventive casing.

SUMMARY OF THE INVENTION

The invention is a novel drilling fluid additive for reducing lost circulation in wellbores. The lost circulation additive is lime encapsulated by a reaction-preventive protective casing to prevent the lime from reacting with clays in the borehole until it is desired to breach the casing. The reaction-preventive protective casing may be a film which will dissolve after a desired time of residence in the borehole or a film or waxy substance which will dissolve or melt at a desired temperature in the borehole. Once the casing around the lime is dissolved, melted or breached in some manner, the lime will be released to react with clays in the formation or in the borehole to form a cement-like mass. The cement-like mass will seal off fissures and pores through which drilling fluid was being lost from the wellbore.

A method for employing the invention drilling fluid additive and reducing lost circulation is also disclosed. The encapsulated lime is placed in the drilling fluid and circulated in the wellbore. Fractures and large pores which are responsible for lost circulation of drilling fluids will claim additional drilling fluid including the encapsulated lime. Once the encapsulated lime has been circulated throughout the well, circulation of the drilling fluid is stopped. Once circulation has ceased, the temperature of the drilling fluid will rise and approach the formation temperature. The film or waxy substance encapsulating the lime will melt, releasing the lime to react with clays in the drilling fluid, and producing a cement-like material which will seal off fractures and large pores. At this time, circulation of the drilling fluid is resumed to flush cement-like material and unreacted lime from the wellbore. The cement-like material in the pores and fractures will remain in the formation, blocking these avenues of lost circulation.

DETAILED DESCRIPTION

Drilling fluids are formulated to intentionally plug porous formations during drilling in order to stabilize the borehole and to control fluid loss. However, formations are frequently encountered that are so porous as to increase the loss of drilling fluids beyond an acceptable limit despite the use of lost circulation additives. Furthermore, a borehole may penetrate a fracture in the formation through which most of the drilling fluid may be lost.

In order to close off large pores and fractures which drain drilling fluid from the borehole, it is necessary to accurately place the lost circulation material at the correct locations and be able to clean up the wellbore after treatment is completed. The beauty of the present invention is that the encapsulated lime can be placed at just the right spots to permanently close off the pores and fractures which drain drilling fluid from the borehole. Because of the mechanics of the process, the unnecessary cement product can be circulated out of the hole before it hardens too much for easy removal. In addition, the lime and clays used to form the lost circulation cement are extremely inexpensive. The encapsulation process will not drastically increase the cost of these materials.

When released from its reaction-preventive protective encapsulation, the lime will react with the clays initially placed in the drilling fluid, the clays from the drill bit cuttings and the clays that are still part of the rock matrix. The lime will react to form calcium bonds with the clays, resulting in a cement-like bond. The invention does not rely on a bridging action over the pores, as does much of the prior art. Instead, the reaction of the lime with the clays forms a permanent treatment to reduce the loss of drilling fluid to the formation.

The invention is applicable to aqueous drilling fluids which contain clays and is not applicable to oil based drilling fluids. The mud should have a pH of about 7 to about 8.5. Most clay-water systems with no supplemental treatment fall within this pH range because of the natural buffering effect of the clays. The invention will perform best with a high concentration of clays in the mud, a concentration which may be supplemented by drill cuttings. If the pH of the fluid is too high (greater than about 8.5) the viscosity may be too high for pumping so the drilling operator will have to add water, which decreases the clay concentration, which will ultimately decrease the effectiveness of the cement-like reaction product.

Different types of reaction-preventive protective casings can be employed to encapsulate the lime and prevent it from reacting with clays in the borehole until the desired time. The casing may be a film which will dissolve after a desired time of residence in the borehole, releasing the lime to react with the clays. An example is a partially water soluble casing which will take a measured time to dissolve, said time be sufficiently long to permit the encapsulated lime to be circulated in the borehole and lost to the formation pores and fractures desired to be sealed off.

A second possibility is a film casing which will dissolve at desired temperatures, releasing the lime for reaction with the clays. It is quite easy to raise the temperature of the mud environment in the drilling hole by slowing down or stopping mud circulation. Once circulation has ceased, the temperature of the formation will heat the drilling fluid constantly until the drilling fluid reaches formation temperature.

A third type of reaction-preventive protective casing is a waxy substance such as a petroleum derived wax which is selected so that its melting point is below the temperature of the underground formation, but above the bottom hole circulating temperature of the drilling fluid within the borehole. With a wax casing around the lime, the encapsulated lime can be circulated in the borehole until sufficient fluid has been lost to fractures and pores that it is desired to seal off. At that time, circulation can be stopped, permitting the temperature of the drilling fluid to rise to formation temperature. The increase in temperature of the drilling fluid will melt the waxy casing, releasing the lime to react with the clays. Petroleum derived paraffinic waxes having a melting point between about 100° F. and about 450° F. are preferred. The wax casings can be selected so that the invention additive will work at different formation temperatures in different wellbores.

Waxes normally melt over a range of temperatures. Thus, it is necessary to select a wax casing for the specific range of temperatures which will be encountered when practicing the invention in a particular wellbore. A hydrocarbon formation along the Gulf Coast may have a formation temperature of 248° F. which will heat up a 90° F. drilling fluid to a temperature of about 210° F. at the bottom of a 16,000 foot hole while circulating mud. This assumes a temperature gradent of 1.1° F. per hundred feet of well depth. Thus, it is necessary to have a film casing or a wax casing which will dissolve somewhere between the temperatures of 210° F. and 248° F.

Since it is preferred to have some margin of safety over the bottom hole circulation temperature of 210° F., it is preferred to select a wax or film casing which will dissolve within the temperature range of about 220° F. to about 247° F. With such a reaction-preventive protective casing, the lime will not be released for reaction with clays until mud circulation is ceased and the formation has had some time to heat up the drilling fluid to near the formation temperature of 248° F. Since it undesirable to have the protective casing melt or dissolve before the encapsulated is spotted at the right locations, it is desirable to have the melting point of the protective casing close to the formation temperature. It is also preferred to have the lime released for reaction with the clays within about 4 to 6 hours.

The reaction-preventive casing must be substantially chemically inert to the encapsulated lime and to the external medium around it. The casing should be resistant to diffusion in either direction, somewhat resistant to breakage from mechanical forces, and generally stable through temperature variations. Additionally, the casing must dissolve or melt at the proper time.

The above described properties are general properties and are subject to exceptions. If a reaction-preventive protective casing is employed which will dissolve after a given period of time in a medium to release the lime, preferably at least several hours, the protective casing will not be chemically inert to the external medium containing it. Protective casings are also employed in the pharmaceutical industry which permit limited diffusion of the encased material through the protective encapsulation. Such a casing could be designed to permit limited diffusion of lime through the casing after a sufficient period of mud circulation time to have the fluid and encapsulated lime spotted in the proper areas. Stability of temperature variation is also important since it may be necessary for the encapsulated lime to go from an 80° F. temperature to about a 200° F.–350° F. temperature without releasing the lime.

The capsules must also be able to resist substantial physical and mechanical forces placed on the protective casings without breaking. The encapsulation must remain sufficiently intact during the pumping and circulation process so that a significant amount of lime is not released into the drilling fluid before the desired time. The shearing forces placed on the casings may be substantial during mud circulation. Additionally, the protective casings must be able to survive storage, wherein capsule breakage may occur as a result of the weight of the encapsulated lime stored in barrels and tanks. For this reason, it may be necessary to perform a neutralization treatment on the encapsulated lime when removing it from storage prior to mixing the encapsulated lime with the mud. A dilute acid may be employed to neutralize any lime which may have been released as a result of capsule breakage.

For ease of encapsulation, spherical shaped particles are generally preferred for most encapsulation processes. However, a spherical shape is not crucial for some coating processes. Furthermore, a spherical shape is stronger structurally than other shapes, and is more likely to survive unbroken in storage and mud circulation.

The preferred encapsulating materials of the invention are organic waxes, especially petroleum derived paraffinic waxes. The organic waxes include organic esters, higher fatty acids and alcohols, and their mixtures, petroleum paraffinic waxes, synthetic waxes such as acrylic and vinyl polymers, polyolefins, and acrylic, olefinic or vinyl modified natural waxes and their mixtures. Preferred encapsulation materials are petroleum-derived waxes alone or in combination with vinyl resins, such as copolymers of ethylene and vinyl acetate, which provide superior strength and abrasion resistance.

The encapsulation process can be one of many methods well known in the art, such as spray coating, condensation, electrostatic coating, and solvent deposition. If a wax casing is employed which will melt at a desired temperature within the borehole, it is not even necessary that the casing be of a uniform thickness. The casing need not completely encapsulate the lime, provided that lime outside of the casing is neutralized prior to placing the encapsulated lime within the drilling fluid. U.S. Pat. Nos. 3,971,852; 4,036,301; and 4,362,566 describe several methods of encapsulating materials. These U.S. Pat. Nos. 3,971,852; 4,036,301; and 4,362,566 are herein incorporated by reference.

One method of encapsulating lime with a waxy substance to form the invention lost circulation additive is to mix lime with a melted waxy substance until a uniform mixture is obtained. The mixture is then solidified and sheared to form relatively small particles. After shearing, the particles are placed in an acid bath to neutralize the exposed lime. It may then be necessary to wash the acid from the encapsulated lime so as to not significantly effect the pH of the drilling fluid when the encapsulated lime is placed therein. Some encapsulation methods such as spray drying may permit simultaneous cooling and shearing of the lime and wax mixture to form relatively small particles.

The invention also includes a method for reducing the lost circulation of drilling fluids in a borehole by employing the encapsulated lime. The method steps are, of course, dependent upon the particular type of encapsulation employed. If a wax with the desired melting point range encapsulates the lime, the encapsulated lime is circulated through the borehole in the drilling fluid until the encapsulated lime is properly spotted. The circulation of the drilling fluid is stopped for a sufficient time to allow the temperature of the drilling fluid to be raised above the melting point of the wax casings. The wax melts, releasing the lime to react with the clays in the borehole and in the formation to produce a cement-like material which will substantially reduce lost circulation of drilling fluid. Circulation is then resumed to clear the borehole of undesired compounds.

This embodiment of the invention is particularly effective for closing off fractures and large pores without clogging the borehole. This is because the underground formation heats up the drilling fluid in the borehole starting at the outside of the borehole and working towards the center of the borehole. Thus, the wax casings will melt on the outside of the borehole releasing the lime for reaction at a substantially faster rate than the wax casings will melt in the middle of the borehole. Thus, substantial reaction will occur on the edges of the borehole, before the lime and clay product has a chance to rigidly set in the center of the borehole, permitting resumed circulation to clean out the borehole of undesired compounds. This is particularly true when the invention method is used to seal off fractures which the borehole has penetrated. Normally, the fractures are smaller than the wellbore so that the lime and clay reaction product will set in the fractures long before the cement-like material will set in the borehole.

Usually, it is immediately apparent when a fracture is penetrated by the wellbore. The mud pressure will drop and less drilling fluid will be circulated back to the top of the hole. Large fractures can be responsible for draining off almost all of the drilling fluid. When this occurs, the encapsulated lime should be placed in the drilling fluid and pumped down the hole. Sufficient drilling fluid containing the encapsulated lime is circulated to insure that the fracture contains substantial amounts of the treated drilling fluid. Of course, the encapsulated lime will accompany the drilling fluid into the fracture. Circulation is then stopped. After a period of time necessary for the wax casings to melt and release the lime for reaction with the clays, circulation is resumed. After a short period of circulation, drilling fluid pressure will begin increasing and more mud will be circulated back to the surface of the well. The increase in pressure and mud returned to the surface is a strong indication that the invention has worked and the fracture is sealed. Circulation is then increased to clear the borehole of undesired compounds, including any cement-like material which has started to set in the borehole proper.

The following example will further illustrate the novel lost circulation additive and invention method of the present invention. This example is given by way of illustration and not as a limitation on the scope of the invention. Thus, it should be clearly understood that the invention additive and method may be varied to achieve similar results within the scope of the invention.

EXAMPLE

A $C_{27}$–$C_{28}$ petroleum based wax with a melting point of about 135°–150° F. was employed to encapsulate lime. 20 grams of lime was added to 50 cc of melted wax. The melted wax and lime was mixed thoroughly until a uniform mixture was obtained. This hot suspension was then poured into a blender containing cold tap water which solidified the mixture. The mixture was thoroughly sheared in the blender to form small granules.

The solid wax-lime mixture was then removed, placed in a beaker of tap water and mixed. Dilute hydrochloric acid was added to obtain a pH of about 4.0 to neutralize any exposed lime on the granular particles. The solid mass was then removed from the acid bath and added to a drilling fluid.

The drilling fluid was prepared by adding 40 grams of Aqua Gel to 400 cc of tap water. Aqua Gel is a trademarked clay, primarily montmorillonite, sold by NL Baroid, Inc.

Several standard API drilling fluid tests were run according to the procedure recommended by the API and published in *Standard Procedure for Testing Drilling Fluids*, American Petroleum Institute, Washington, D.C. (9th ed. 1982). The tests conducted were plastic viscosity (in cp), yield point (in lbs/100 ft$^2$), apparent viscosity (in lbs/100 ft$^2$), and gel strength (in lbs/100 ft$^2$).

The Aqua Gel and water mixture had an apparent viscosity of 27.5 lbs/100 ft$^2$, a yield point of 21 lbs/100 ft$^2$ and a plastic viscosity of 17 cp.

50 grams of the encapsulated lime was added to the Aqua Gel and water drilling fluid and mixed for 30 minutes. The encapsulated lime was then screened out and the base mud properties were rechecked. No significant change in the mud properties was noted.

The encapsulated lime was added back to the base mud, stirred until well mixed and then placed in an oven at 150° F. overnight. The next morning, the mud was removed from the oven and tested at 150° F. The mud had formed a semi-solid mass with a high temperature shear of 725 lbs/100 ft$^2$. This semi-solid mass, when formed in a zone of lost circulation, would be extremely effective in shutting off the zone.

Many other variations and modifications may be made in the concepts described above by those skilled in the art without departing from the concepts of the present invention. Accordingly, it should be clearly understood that the concepts in the description are illustrative only and are not intended as limitations on the scope of the invention.

What is claimed is:

1. A drilling fluid additive for reducing lost circulation of aqueous drilling fluids in a borehole penetrating an underground formation, comprising:
   lime encapsulated by an organic wax having a melting point below the temperature of the underground formation and above the bottom hole circulating temperature of the drilling fluid within the borehold, said encapsulation to prevent the lime from reacting with clays in the borehole and drilling fluid until it is desired to melt the organic wax encapsulation.

2. The drilling fluid additive of claim 1, wherein the lime is encapsulated by:
   mixing lime with a melted organic wax until a uniform mixture is obtained;
   solidifying the mixture;
   shearing the mixture to form relatively small particles; and
   placing the particles in an acid bath to neutralize exposed lime.

3. The drilling fluid additive of claim 1, wherein the lime is encapsulated by:
   mixing the lime with a melted organic wax until a uniform mixture is obtained;
   simultaneously cooling and shearing the mixture to form relatively small particles; and
   placing the particles in an acid bath to neutralize exposed lime.

4. The drilling fluid additive of claim 1, wherein the organic wax is a petroleum derived paraffinic wax.

5. The drilling fluid additive of claim 2, wherein the organic wax has a melting point between about 100° F. and about 450° F.

6. A method of reducing lost circulation of aqueous drilling fluids in a borehole penetrating an underground formation, comprising:
   adding lime encapsulated with an organic wax to the drilling fluid, said organic wax having a melting point below the temperature of the formation and above the bottom hole circulating temperature of the drilling fluid within the borehole;
   circulating the drilling fluid within the borehole;
   stopping the circulation of drilling fluid for a sufficient time to allow the temperature of the drilling fluid to rise above the melting point of the organic wax, permitting the previously encapsulated lime to react with clays in the borehole; and
   resuming circulation to clear the borehole of undesired compounds.

* * * * *